(12) United States Patent
Comeau et al.

(10) Patent No.: US 9,227,512 B2
(45) Date of Patent: Jan. 5, 2016

(54) DATA EXTRACTION METHOD

(71) Applicants: Felix J. E. Comeau, Toronto (CA);
Denise L. Connerty, Toronto (CA)

(72) Inventors: Felix J. E. Comeau, Toronto (CA);
Denise L. Connerty, Toronto (CA)

(*) Notice: Subject to any disclaimer, the term of this patent is extended or adjusted under 35 U.S.C. 154(b) by 0 days.

(21) Appl. No.: 14/100,876

(22) Filed: Dec. 9, 2013

(65) Prior Publication Data
US 2014/0164233 A1 Jun. 12, 2014

Related U.S. Application Data

(60) Provisional application No. 61/734,417, filed on Dec. 7, 2012.

(51) Int. Cl.
| B60K 28/00 | (2006.01) |
| G06Q 40/00 | (2012.01) |
| B60K 28/06 | (2006.01) |
| G06Q 20/10 | (2012.01) |
| G07C 5/00 | (2006.01) |
| G07C 5/08 | (2006.01) |

(52) U.S. Cl.
CPC ............ *B60K 28/063* (2013.01); *G06Q 20/102* (2013.01); *G07C 5/008* (2013.01); *G07C 5/085* (2013.01); *G07C 5/0808* (2013.01)

(58) Field of Classification Search
USPC ....................... 705/35, 41; 180/272
See application file for complete search history.

(56) References Cited

U.S. PATENT DOCUMENTS

| 2010/0108425 | A1* | 5/2010 | Crespo | ................. | B60K 28/063 |
| | | | | | 180/272 |
| 2013/0048403 | A1* | 2/2013 | Doinoff | ............... | B60K 28/063 |
| | | | | | 180/272 |

* cited by examiner

Primary Examiner — Edward Chang
(74) Attorney, Agent, or Firm — Head, Johnson & Kachigian, P.C.

(57) ABSTRACT

An improved ignition interlock system being of the type including a plurality of ignition interlock devices. A vehicle is provided in which each device is installed. The plurality of service centers are provided with each service center having an associated computer adapted to extract data. A wireless transceiver is associated with each device. A wireless transceiver is associated with each service center. Computing functionality is associated with the service centers and with the devices and adapted such that when any of the vehicles attends any of the service centers, the computer associated with that service center can extract the data from the device disposed within that vehicle.

13 Claims, 4 Drawing Sheets

DATA EXTRACTION METHOD

CROSS-REFERENCE TO RELATED APPLICATIONS

This application claims priority to U.S. Provisional Application No. 61/734,417, filed Dec. 7, 2012, which is herein incorporated by reference.

BACKGROUND OF THE INVENTION

1. Field of the Invention

The invention relates to the field of ignition interlock devices, including breath alcohol ignition interlock devices.

2. Prior Art

In many jurisdictions, it is illegal to operate a vehicle while under the influence of alcohol.

In some jurisdictions, a person who has been convicted of driving under the influence of alcohol is required, prior to recovery of full driving privileges, to participate in a program which involves the temporary installation of a breath alcohol ignition interlock device [BAIID] in his or her vehicle. The BAIID is capable of receiving and analyzing a breath sample, to determine the extent to which the person giving the sample is under the influence of alcohol, and renders the vehicle disabled until a satisfactory breath sample is delivered.

It is commonplace for the governing legislation to require the vehicle to be returned on a periodic basis for visual inspection [to ensure that tampering has not occurred] and for extraction of data.

It is also commonplace for a BAAID supplier to a jurisdiction to establish a number of service centers in that jurisdiction whereat the units can be installed and removed from vehicles and maintained and whereat visual inspection and data extraction can be carried out.

Data extraction typically involves the creation of a physical link between the BAAID and a network computer resident at a service centre.

SUMMARY OF THE INVENTION

Forming one aspect of the invention is an improved ignition interlock system. The system is of the type including: a plurality of ignition interlock devices; for each device, a vehicle in which said each device is installed; and a plurality of service centers, the service centers each having an associated computer adapted to extract data. The improvement comprises: a wireless transceiver associated with each device; a wireless transceiver associated with each service centre; and computing functionality associated with the service centers and the devices and adapted such that, when any of the vehicles attends at any of the service centers, the computer associated with that service center can extract the data from the device disposed within that vehicle.

According to another aspect of the invention, each device can be a breath alcohol ignition interlock device.

According to another aspect of the invention, each device can be adapted to enter a lockout condition rendering the vehicle in which it is installed incapable of operation if the time between successive attendances of the vehicle at a service center exceeds a predetermined period.

According to another aspect of the invention, the lockout condition can be associated with the time between successive extractions of data.

According to another aspect of the invention, the computing functionality can (i) maintain a database, the database including a record for each device, said record including fields containing data which is indicative, at least, of a payment history associated with the device and (ii) be adapted such that, when the device is brought into operative proximity of the service centre, the wireless data extraction occurs automatically, provided that the associated record in the database contains data that indicates that payment has been remitted for the extraction.

According to another aspect of the invention, the lockout condition can be associated with the time between successive extractions of data from the device and one or more of the time between successive inspections of the vehicle and the time between successive calibrations of the device.

According to another aspect of the invention, the computing functionality can (i) maintain a database, the database including a record for each device, said record including fields containing data which is indicative, at least, of a payment history associated with the device and (ii) be adapted such that, when the device is brought into operative proximity of the service centre, the wireless data extraction occurs automatically, provided that the associated record in the database contains data that indicates that payment has been remitted for the extraction.

According to another aspect of the invention, a remote payment functionality can enable payment to be remitted via a call centre or website.

According to another aspect of the invention, the device can be adapted to provide an indication when data extraction has been completed.

According to another aspect of the invention, the computing functionality and the devices can be adapted such that, when a device is brought into operative proximity of the service centre, if the associated record in the database does not contain data that indicates that payment has been remitted for the extraction, the device provides an indication to a user that automatic extraction will not occur.

According to another aspect of the invention, the computing functionality and the devices can be adapted such that each device provides an indication at least when the lockout condition is imminent.

According to another aspect of the invention, the service centers can include full service centers, wherein devices are installed, removed and maintained, and inspection centers, wherein data extraction occurs.

According to another aspect of the invention, the full service centers can be fewer in number and geographically more dispersed than the inspection centers.

Other aspects, advantages and features of the invention will become evident upon a review of the detailed description which follows.

DETAILED DESCRIPTION OF THE PREFERRED EMBODIMENTS

Figure 1:
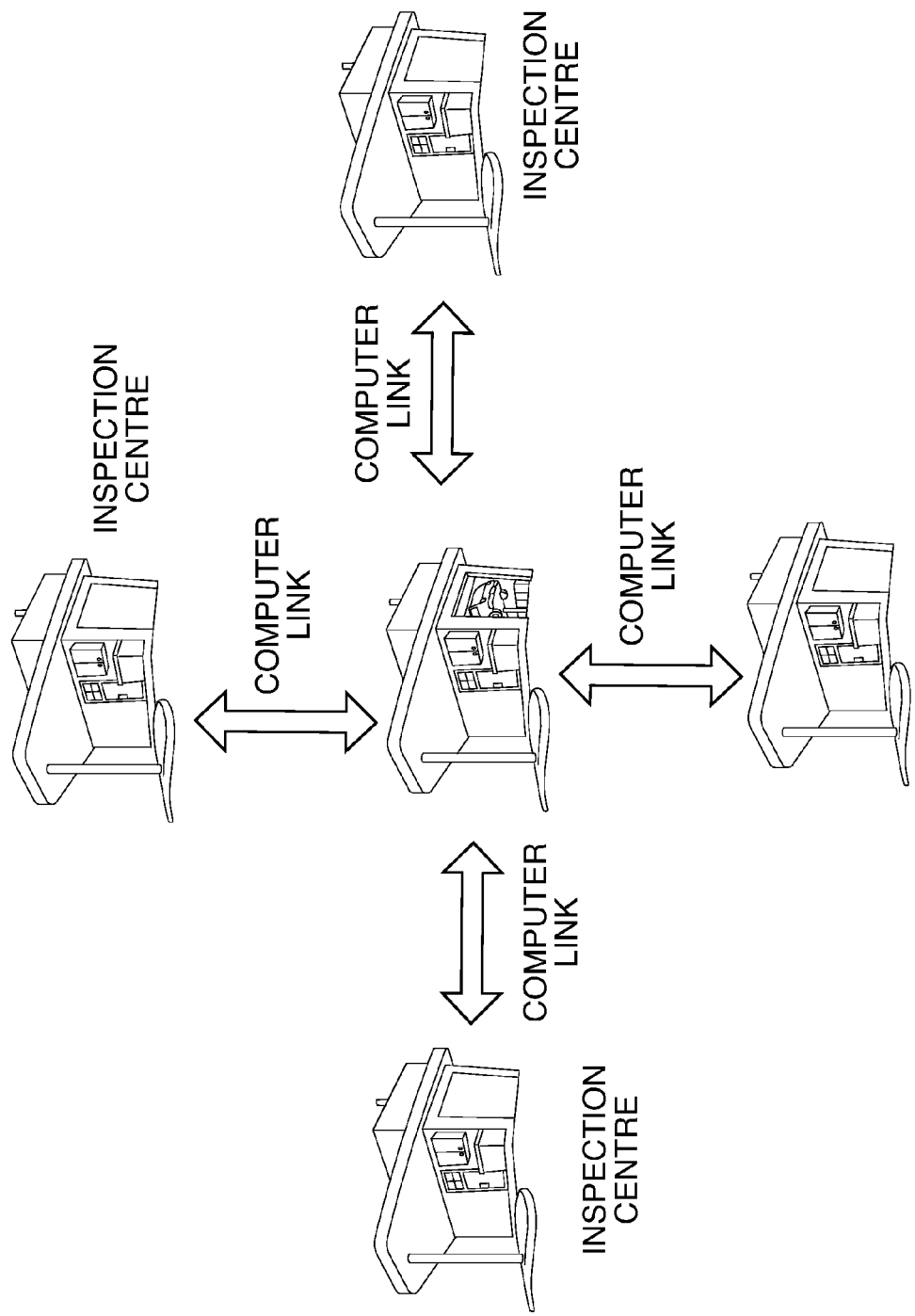
FIG. 1 is a simplified schematic diagram of the invention.
Figure 2:
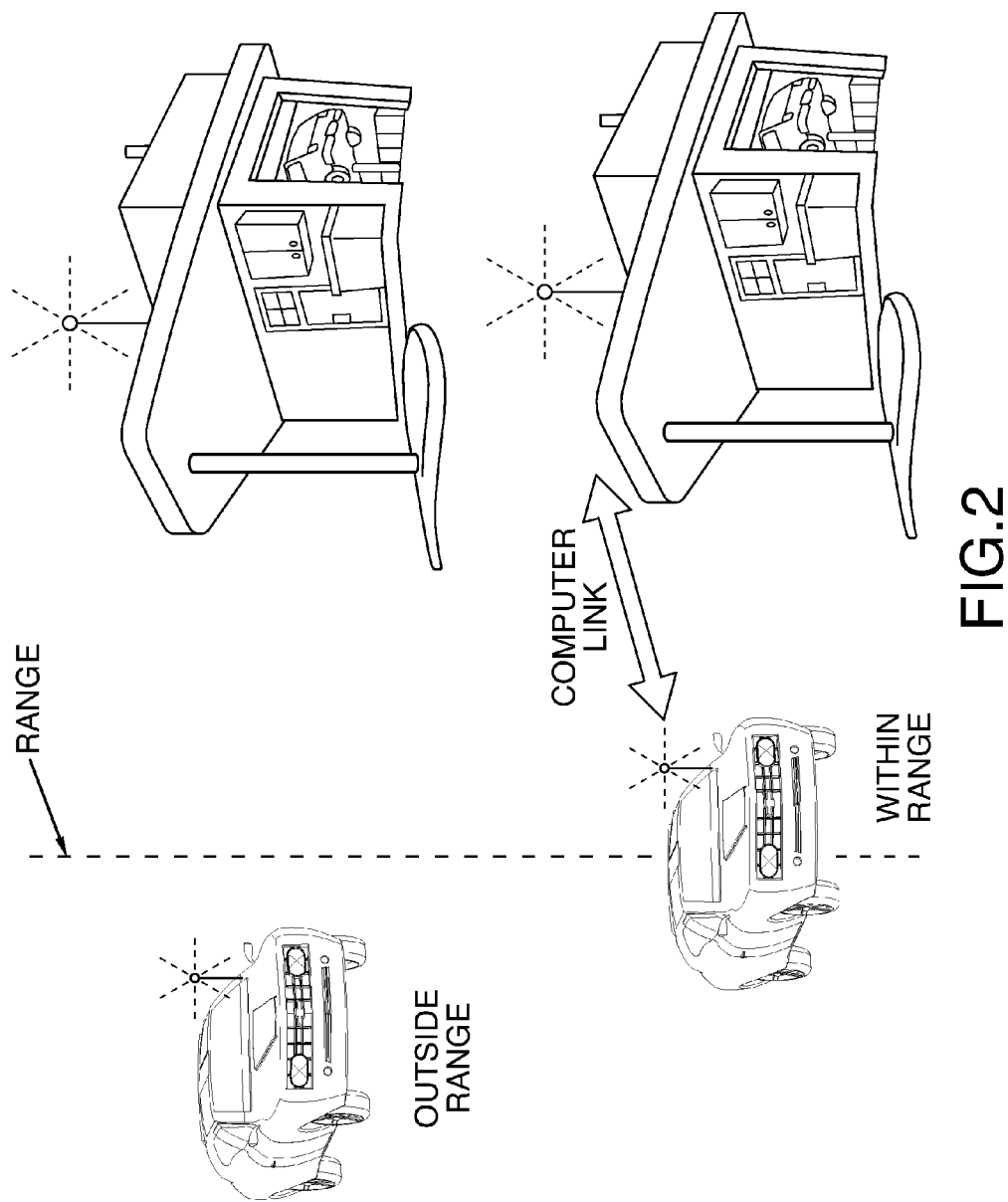
FIG. 2 is a further simplified schematic diagram of the invention.
Figure 3:
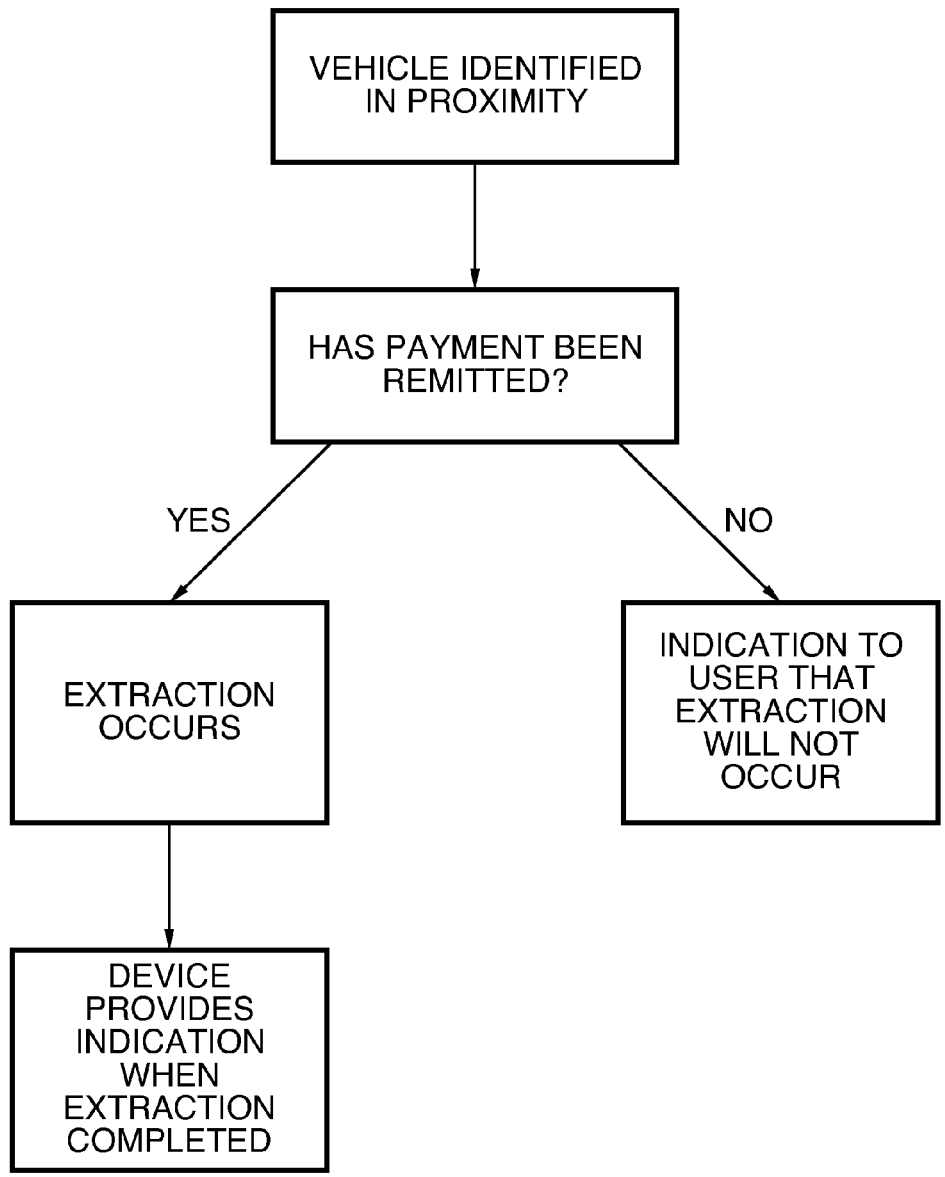
FIGS. 3 and 4 illustrate flow charts showing the method or process of the present invention.
Figure 4:
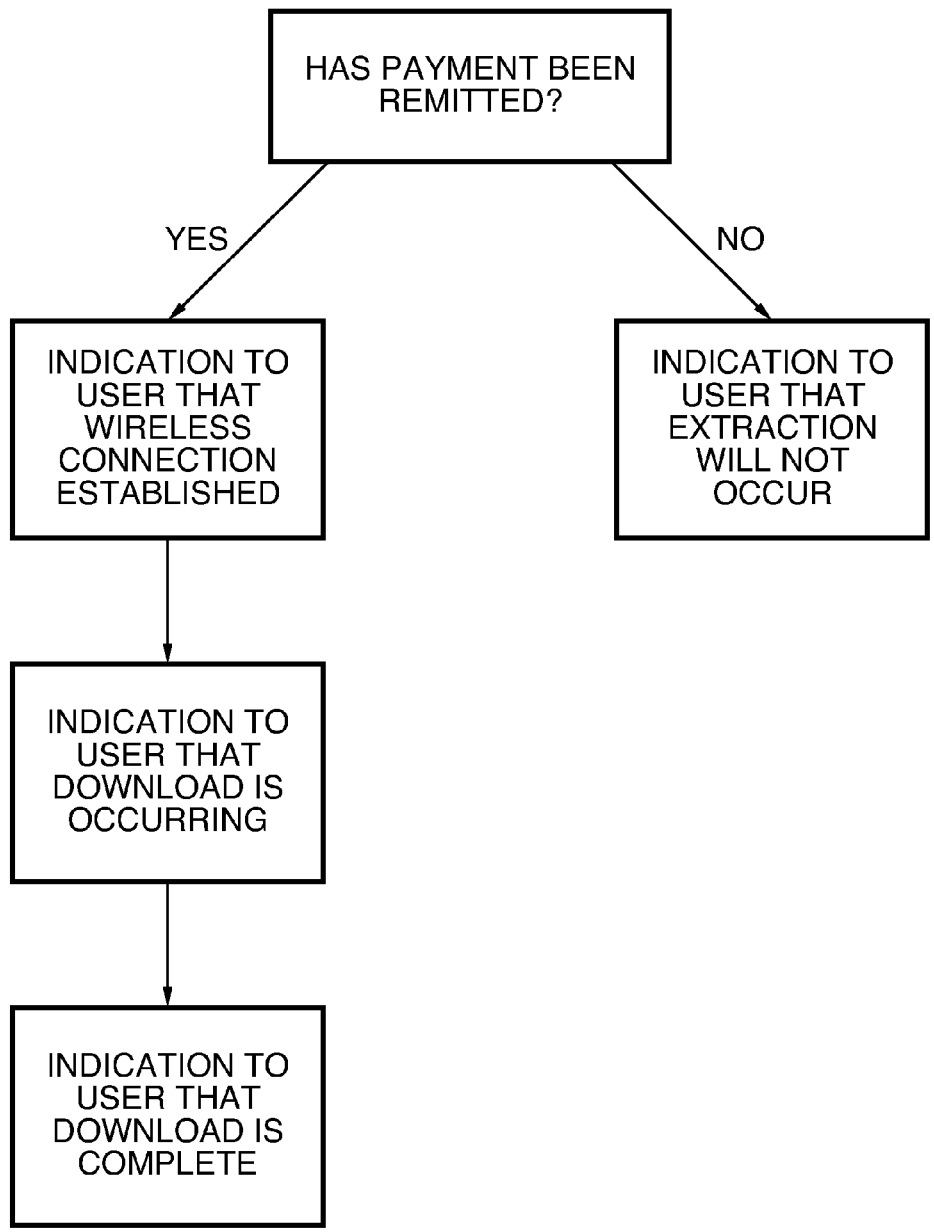

An improved ignition interlock system according to an exemplary embodiment of the invention is hereinafter described and will be understood to be for use with a plurality of vehicles and to include breath alcohol ignition interlock devices and service centers.

The breath alcohol ignition interlock devices are, in use, provided one for and installed in each vehicle, typically by the operator of the service centers and on a compensation model that includes at least a periodic payment during the period in which the device is installed in the vehicle or otherwise dispossessed from the operator of the service centers.

Each device shares functionality with conventional interlock devices, in that the device enters a lockout condition rendering the vehicle in which it is installed incapable of operation if the time between successive attendances of the vehicle at a service center exceeds a predetermined period. Normally, each time the vehicle attends at a service centre, data contained in the device is extracted therefrom. Thus, from another standpoint, the lockout condition can be viewed as associated with the time between successive extractions of data.

The service centers each share functionality with conventional service centers in that each has an associated computer adapted to provide for said data extraction.

The improvement comprises: a wireless transceiver associated with each device; a wireless transceiver associated with each service centre; and computing functionality associated with the service centers and the devices.

The computing functionality is adapted such that, when any of the vehicles attends at any of the service centers, the computer associated with that service center can wirelessly extract the data from the device disposed within that vehicle.

In one exemplary embodiment, particularly well suited for use in offender programs in those jurisdictions which do not require periodic inspection of vehicles and/or device calibration:

- the lockout condition is associated strictly with the time between successive extractions of data
- the computing functionality maintains a database including a record for each device
- the device record includes fields containing data which is indicative, at least, of a payment history associated with the device
- the computing facility is adapted such that, when the device is brought into operative proximity of the service centre, the wireless data extraction occurs automatically, provided that the associated record in the database contains data that indicates that payment has been remitted for the extraction
- the computing functionality and the devices are adapted such that, when a device is brought into operative proximity of the service centre, if the associated record in the database does not contain data that indicates that payment has been remitted for the extraction, the device provides an indication to a user that automatic extraction will not occur
- the device is adapted to provide an indication when data extraction has been completed [the indication could be, for example, the illumination of an LED light, a generated tone or a textual message presented on a screen/display of the device handset or ECU]

It will be evident that this embodiment has advantage over known offender systems, in that at least some of the service centers can operate without staff at least some of the time.

Device users can, for example pre-pay by any conventional methodology, including but not limited to:

- physical presentation of payment at a staffed service center in any conventional manner, either in bulk or periodically in advance
- presentation of payment at a staffed center by remote delivery of credit card information
- delivery of payment periodically in advance by telephone or Internet banking
- pre-authorized payment by periodic automatic withdrawal from a bank account or credit card and attend at a service centre from time to time for data extraction. The user will know that he or she is safe to drive away when the device indicates [as mentioned above] that data extraction has been completed. This indication may manifest as a signal or message specific to the extraction process, or it may be more akin to a reset; for example, if the device in question is embodied so as to indicate that the user that the lockout condition is imminent, perhaps in the form of an amber light [because the deadline for data extraction is approaching], data extraction completion could be associated with the extinguishment of the amber light and the illumination of a green light.

As a particularly advantageous embodiment, the operator of the vehicle will be provided with a periodic status updates during the extraction process, i.e.

- wireless connection established
- downloading
- extraction complete

In the event, for example, that the applicable payments had not been made in advance, the status updates in the particularly preferred exemplary embodiment might read:

- wireless connection established
- account is in arrears—download terminated

The ability to avoid staff allows significant flexibility in terms of resources deployment, which will depend upon the particular jurisdiction in question.

In large, sparsely populated jurisdictions, for example, a greater number of service centers can be established without raising cost, so as to provide greater convenience to users [i.e. shorter driving distances and extended hours]; in small, more heavily populated jurisdictions, the number of service centers may be maintained, but costs reduced. Some operators may choose to establish include full service centers, wherein devices are installed, removed and maintained, and inspection centers, wherein only data extraction occurs.

As previously indicated, some jurisdictions require periodic vehicle inspection and/or device calibration in their offender programs. In those jurisdictions, the invention may be embodied differently. In an exemplary embodiment suitable for these jurisdictions:

- the lockout condition is associated with the time between successive extractions of data from the device and one or more of the time between successive inspections of the vehicle and the time between successive calibrations of the device
- the computing functionality maintains a database including a record for each device
- the device record including fields containing data which is indicative, at least, of a payment history associated with the device
- the computing facility is adapted such that, when the device is brought into operative proximity of the service centre, the wireless data extraction occurs automatically, provided that the associated record in the database contains data that indicates that payment has been remitted for the extraction
- the computing functionality and the devices are adapted such that each device provides an indication at least when the lockout condition is imminent Again, the indication could, for example, be the illumination of an LED light, a generated tone or a text message presented on a screen/display of the device handset or ECU.

This embodiment can maintain some of the flexibility associated with the prior embodiment, depending upon, inter alia, the regulatory regime applicable in the jurisdiction.

For example, in some jurisdictions, the time periods applicable to data extraction and vehicle inspection may be different, i.e. operators may need to attend frequently for data extraction, but may only need to attend for calibration and inspection at wide intervals, unless the data extracted suggests that the tampering or malfunction may have occurred. In these jurisdictions, at least some of the service centers can operate without staff at least some of the time. Device users can, for example, pre-pay by mail, telephone or website, etc., attend at an unstaffed service center from time to time for data extraction and, less frequently, attend at a staffed service centre for visual inspection.

In those jurisdiction wherein the time periods applicable to data inspection and visual inspection are the same, savings will still result from the lack of labor associated with data extractions, but the benefits of lights-out operation will be less apparent: clients could attend at unstaffed facilities for data extraction, but would still need to attend at a staffed facility for inspection and/or calibration, as required by the jurisdiction.

Whereas but a few specific embodiments are described, it will be apparent that variations are possible.

In one such variation, the system could be embodied for interlock devices adapted to test for drugs of abuse such as narcotics.

In another such variation, the system could be embodied for interlock devices adapted to sense for fatigue.

In another such variation, the system could be used in fleet applications. In these applications, the issue of payment will typically be handled fleet-wide and accordingly, wireless data extraction will occur upon each presentation of a device at a service center.

In the context of, for example, long haul type fleets, which return to the yard infrequently, the device itself could be otherwise embodied in accordance with the latter of the aforementioned two embodiments, i.e. so as to ensure that the operator visits a fleet yard periodically for data download, the device would be configured so as to disable the vehicle if a predetermined, prolonged period passed between yard visits and data extractions.

In the context of, for example, local fleets, which return to a fleet yard or filling station regularly, the device would be configured to disable the vehicle if a predetermined, relatively short period passed between yard visits; the device would similarly be disabled if a predetermined, relatively long period passed between visual inspections of the device, to ensure tampering had not occurred and the device was in good calibration.

Further, whereas in the context of fleet operators, the invention will often be embodied by a plurality of devices uniquely associated with one or more service centers at which data extraction can occur, this is not necessarily the case. Fleet operators could, for example, have a service center at the home yard, for vehicles operating in the home vicinity, and be provided access, for data extraction purposes only, to service centers associated with offender programs.

Accordingly, the invention should be understood to be limited only by the accompanying claims, purposively construed.

What is claimed is:

1. An improved ignition interlock system, the system being of the type including: a plurality of ignition interlock devices; for each device, a vehicle in which said each device is installed; and a plurality of service centers, the service centers each having an associated computer adapted to extract data, the improvement comprising:

a wireless transceiver associated with each device; a wireless transceiver associated with each service centre; and computing functionality associated with the service centers and the devices and adapted such that, when any of the vehicles attends at any of the service centers, the computer associated with that service center can extract the data from the device disposed within that vehicle;

wherein each device is adapted to enter a lockout condition rendering the vehicle in which it is installed incapable of operation if the time between successive attendances of the vehicle at a service center exceeds a predetermined period;

wherein the lockout condition is associated with the time between successive extractions of data from the device and one or more of the time between successive inspections of the vehicle and the time between successive calibrations of the device; and wherein the computing functionality (i) maintains a database, the database including a record for each device, said record including fields containing data which is indicative, at least, of a payment history associated with the device and (ii) is adapted such that, when the device is brought into operative proximity of the service centre, the wireless data extraction occurs automatically, provided that the associated record in the database contains data that indicates that payment has been remitted for the extraction.

2. The system of claim 1, wherein each device is a breath alcohol ignition interlock device.

3. The system of claim 2, wherein the lockout condition is associated with the time between successive extractions of data.

4. The system of claim 3, wherein the computing functionality (i) maintains a database, the database including a record for each device, said record including fields containing data which is indicative, at least, of a payment history associated with the device and (ii) is adapted such that, when the device is brought into operative proximity of the service centre, the wireless data extraction occurs automatically, provided that the associated record in the database contains data that indicates that payment has been remitted for the extraction.

5. The system of claim 4, further comprising a remote payment functionality, which enables payment to be remitted via a call centre or website.

6. The system of claim 5, wherein the device is adapted to provide an indication when data extraction has been completed.

7. The system of claim 5, wherein the computing functionality and the devices are adapted such that, when a device is brought into operative proximity of the service centre, if the associated record in the database does not contain data that indicates that payment has been remitted for the extraction, the device provides an indication to a user that automatic extraction will not occur.

8. The system of claim 1, further comprising a remote payment functionality, which enables payment to be remitted via a call centre or website.

9. The system of claim 8, wherein the device is adapted to provide an indication when data extraction has been completed.

10. The system of claim 9, wherein the computing functionality and the devices are adapted such that, when a device is brought into operative proximity of the service centre, if the associated record in the database does not contain data that indicates that payment has been remitted for the extraction, the device provides an indication to a user that automatic extraction will not occur.

11. The system of claim 9, wherein the computing functionality and the devices are adapted such that each device provides an indication at least when the lockout condition is imminent.

12. The system of claim 2, wherein the service centers include full service centers, wherein devices are installed, removed and maintained, and inspection centers, wherein data extraction occurs.

13. The system of claim 12, wherein the full service centers are fewer in number and geographically more dispersed than the inspection centers.

* * * * *